(12) United States Patent
Anand et al.

(10) Patent No.: US 10,078,605 B2
(45) Date of Patent: Sep. 18, 2018

(54) MULTIPLE-INTERRUPT PROPAGATION SCHEME IN A NETWORK ASIC

(71) Applicant: CAVIUM, INC., San Jose, CA (US)

(72) Inventors: Vishal Anand, Saratoga, CA (US); Harish Krishnamoorthy, San Jose, CA (US); Guy Townsend Hutchison, Santa Clara, CA (US); Gerald Schmidt, San Jose, CA (US)

(73) Assignee: Cavium, Inc., San Jose, CA (US)

( * ) Notice: Subject to any disclaimer, the term of this patent is extended or adjusted under 35 U.S.C. 154(b) by 592 days.

(21) Appl. No.: 14/521,367

(22) Filed: Oct. 22, 2014

(65) Prior Publication Data

US 2016/0117273 A1 Apr. 28, 2016

(51) Int. Cl.
*G06F 13/26* (2006.01)
(52) U.S. Cl.
CPC .................................. *G06F 13/26* (2013.01)
(58) Field of Classification Search
CPC ....................................................... G06F 13/26
See application file for complete search history.

(56) References Cited

U.S. PATENT DOCUMENTS

| | | | | |
|---|---|---|---|---|
| 6,845,419 B1 * | 1/2005 | Moyer | ..................... | G06F 13/26 710/261 |
| 7,398,533 B1 * | 7/2008 | Slaughter | ................ | H04L 67/16 719/328 |
| 7,406,674 B1 * | 7/2008 | Ogami | ....................... | G06F 8/34 716/117 |
| 8,738,860 B1 * | 5/2014 | Griffin | ................. | G06F 12/0897 711/122 |
| 9,654,409 B2 | 5/2017 | Yadav et al. | | |
| 2006/0242313 A1 * | 10/2006 | Le | ........................... | H04L 69/22 709/230 |
| 2011/0119475 A1 * | 5/2011 | Chen | ......................... | G06F 1/08 713/2 |
| 2012/0005716 A1 * | 1/2012 | Milne | .............. | H04N 21/23655 725/148 |

* cited by examiner

*Primary Examiner* — Henry Tsai
*Assistant Examiner* — John B Roche
(74) *Attorney, Agent, or Firm* — Haverstock & Owens LLP

(57) ABSTRACT

Embodiments of the present invention are directed to a multiple-interrupt propagation scheme, which is an automated mechanism for the specification and creation of interrupts. Interrupts originating at leaf nodes of a network chip are categorized into different service levels according to their interrupt types and are propagated to a master of the network chip via a manager. For each interrupt, depending on its service level, the manager either instantaneously propagates the interrupt or delays propagation of the interrupt to the master. The master forwards the interrupts to different destinations. A destination can be a processing element that is located on the network chip or externally on a different chip.

38 Claims, 3 Drawing Sheets

MULTIPLE-INTERRUPT PROPAGATION SCHEME IN A NETWORK ASIC

FIELD OF INVENTION

The present invention relates to interrupts. More particularly, the present invention relates to multiple-interrupt propagation scheme in a network ASIC.

BACKGROUND OF THE INVENTION

An interrupt is a mechanism that is used to send a signal to a CPU. This signal results in the CPU stopping (interrupting) its current program and switching to an alternate program that allows the CPU to service that interrupt. Interrupts can be raised for multiple reasons. Some interrupts can be raised just to inform the CPU of the occurrence of an event so that certain bookkeeping can be done. Other interrupts can be raised to inform the CPU of certain failures that require actions by the CPU. As such, all interrupts are not equal and require different levels of service.

BRIEF SUMMARY OF THE INVENTION

Embodiments of the present invention are directed to a multiple-interrupt propagation scheme, which is an automated mechanism for the specification and creation of interrupts. Interrupts originating at leaf nodes of a network chip are categorized into different service levels according to their interrupt types and are propagated to a master of the network chip via a manager. For each interrupt, depending on its service level, the manager either instantaneously propagates the interrupt or delays propagation of the interrupt to the master. The master forwards the interrupts to different destinations. A destination can be a processing element that is located on the network chip or externally on a different chip.

In one embodiments, a network device is provided. The network device includes a plurality of modules, a plurality of interrupts originating from at least a portion of the plurality of modules, wherein each of the plurality of interrupts is associated with one of a plurality of service levels, a manager configured to receive the plurality of interrupts and, for each interrupt received at the manager, to perform a first action when an associated service level of a corresponding interrupt received at the manager is a first level and to perform a second method when the associated service level of the corresponding interrupt received at the manager is of a second level, and a controller is configured to receive the plurality of interrupts from the manager and to forward the plurality of interrupts received at the controller to different destinations.

In some embodiments, the network device also includes a network ASIC, wherein the plurality of modules, the manager and the controller are located on the network ASIC. In some embodiments, the network device also includes a first processing unit located on the network ASIC and a second processing unit externally located on a chip different from the network ASIC. In some embodiments, the different destinations include the first processing unit and the second processing unit.

In some embodiments, the network device also includes a XML description of different interrupts, wherein the XML description is stored in the memory, and a script that generates a plurality of registers for each interrupt raised, wherein the script is stored in the memory. In some embodiments, the plurality of registers include at least two priority registers, a status register and a test register. In some embodiments, the script categorizes each of the plurality of interrupts based on the XML description and updates the plurality of registers associated with the each of the plurality of interrupts.

In some embodiments, each of the plurality of modules is a slave that includes a set of registers. The plurality of modules can be hierarchically organized.

In some embodiments, the first level is high priority and the first action is to instantaneously propagate the corresponding interrupt to the controller. In some embodiments, the second level is low priority and the second action is delay propagation of the corresponding interrupt to the controller.

In another embodiment, a network device is provided. The network device includes a multiple interrupt propagation scheme and a network ASIC. The network ASIC configured to implement the multiple interrupt propagation scheme and including a plurality of modules generating a plurality of interrupts, wherein the plurality of interrupts is categorized according to their interrupt types, a manager configured to forward each of the plurality of interrupts according to an associated categorization of a corresponding interrupt, and a controller configured to forward the plurality of interrupts received from the manager to a plurality of destinations.

In some embodiments, the multiple interrupt propagation scheme uses a user-defined register specification and a script that are both stored in memory of the network device. In some embodiments, the user-defined register specification includes associated service level of each interrupt. In some embodiments, the user-defined register specification includes destination data of each interrupt.

In some embodiments, the script generates at least two priority registers for each interrupt, wherein the at least two priority registers correspond to different service levels. In some embodiments, a first of the at least two priority registers allow an interrupt to be configured as a high priority interrupt, and a second of the at least two priority registers allow the interrupt to be configured as a low priority interrupt. In some embodiments, the characterization of the corresponding interrupt is associated with one of the different service levels. In some embodiments, the script categorizes each of the plurality of interrupts based on the user-defined register specification.

In some embodiments, the controller is a PCIe controller.

In some embodiments, each of the plurality of modules is a slave that includes a set of registers. The plurality of modules can be hierarchically organized.

In some embodiments, the plurality of destinations include a first processing unit located on the network ASIC and a second processing unit externally located on a chip different from the network ASIC.

In some embodiments, a processing unit at each of the plurality of destinations determines how soon the processing unit will service each request received.

In some embodiments, the forwarding of an interrupt by the manager is either instantaneous or delayed.

In yet another embodiment, a method of implementing a network ASIC in a network device is provided. The network device typically includes a plurality of modules, a manager, and a controller. The method includes raising an interrupt at one of the plurality of modules, propagating the interrupt to the manager from one of the plurality of modules, performing, by the manager, a first action when an associated service level of the interrupt received at the manager is a first level, performing, by the manager, a second method when the associated service level of the interrupt received at the manager is of a second level, and forwarding the interrupt, by the controller, to one of a plurality of destinations.

In some embodiments, the method also includes, after raising an interrupt and propagating the interrupt, running a script to categorize the interrupt and to update a plurality of registers associated with the interrupt. In some embodiments, the interrupt is categorized according to a user-defined register specification, wherein the user-defined register specification includes information regarding an associated service level of the interrupt and information regarding destination of the interrupt. The one of the plurality of destinations is indicated in the user-defined register specification. The plurality of registers include at least two priority registers that corresponds with at least two different service levels.

In some embodiments, the first level is high priority and the first action is to instantaneously propagate the interrupt to the controller. In some embodiments, the second level is low priority and the second action is delay propagation of the interrupt to the controller.

In some embodiments, each of the plurality of modules is a slave that includes a set of registers. The plurality of modules can be hierarchically organized. In some embodiments, the interrupt is propagated from the one of the plurality of modules to the manager via other modules in the plurality of modules.

In some embodiments, the one of the plurality of destinations is a processing unit located on the network ASIC. Alternatively, the one of the plurality of destinations is a processing unit located on a chip different from the network ASIC.

In some embodiments, the plurality of modules, the manager and the controller are located on the network ASIC.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

Figure 1:
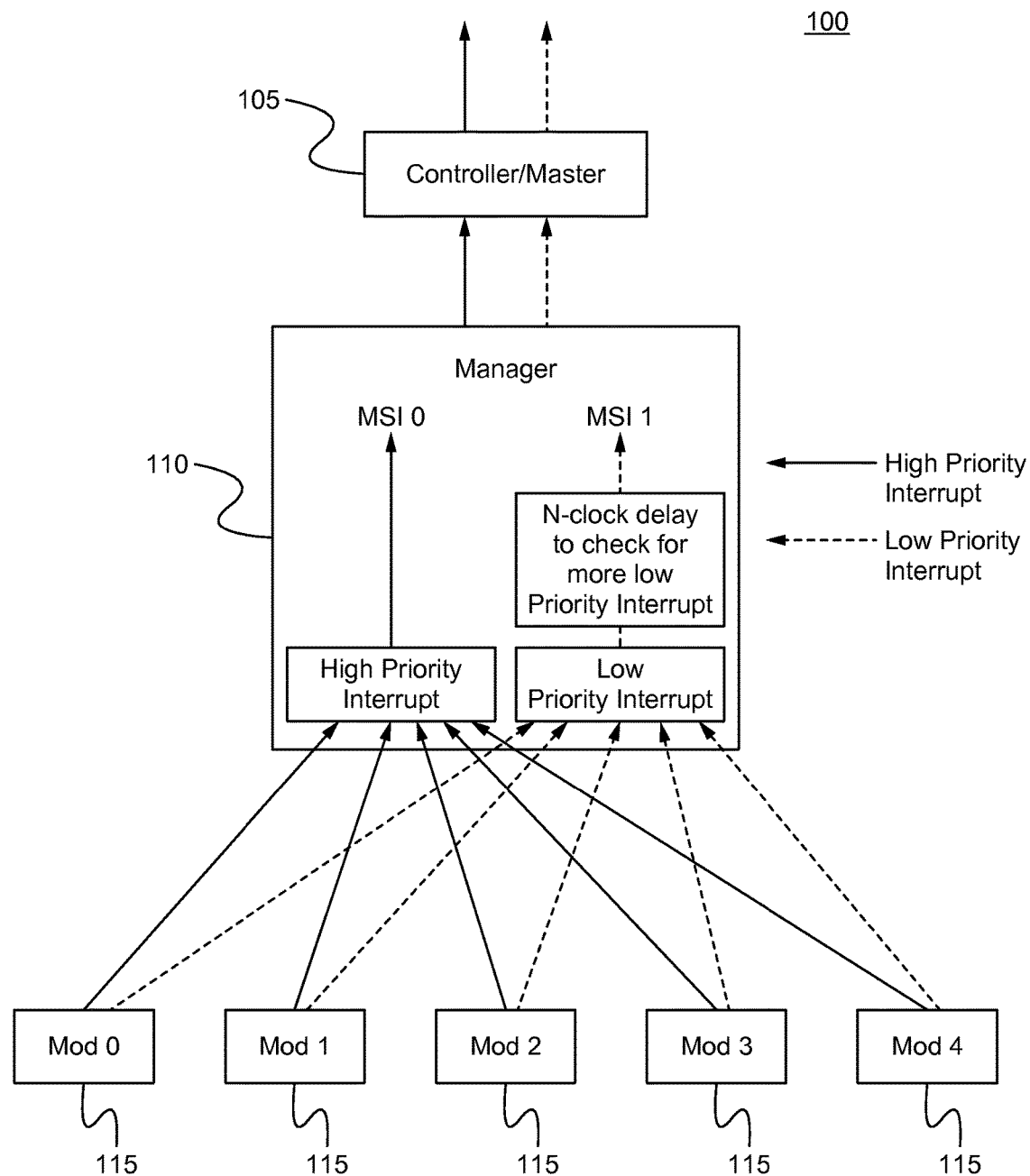
FIG. 1 illustrates an exemplary configuration interface of a network chip in an electronic system in accordance with some embodiments.

In the following description, numerous details are set forth for purposes of explanation. However, one of ordinary skill in the art will realize that the invention can be practiced without the use of these specific details. Thus, the present invention is not intended to be limited to the embodiments shown but is to be accorded the widest scope consistent with the principles and features described herein.

An electronic system includes a processing element, such as a CPU (central processing unit), and a network chip that includes dedicated hardware. An exemplary network chip that includes dedicated hardware is a network ASIC (application specific integrated circuit). The CPU can be located on the same chip as the dedicated hardware or could be located externally on another chip. In some embodiments, the electronic system can include a combination of the above. For example, a first plurality of CPUs can be located on the same chip as the dedicated hardware and a second plurality of CPUs can be located externally on one or more other chips.

The electronic system also includes memory, a master and one or more slaves. One or more of the memory, the master and the one or more slaves can be located on the same chip as the dedicated hardware. A slave includes a set of registers. In some embodiments, these registers are implemented as flip-flops. In some embodiments, the electronic system is a network device, such as a network switch.

Some embodiments are directed to a multiple-interrupt propagation scheme, which is an automated mechanism for the specification and creation of interrupts. Interrupts originating at leaf nodes of a network chip are categorized into different service levels according to their interrupt types and are propagated to a master of the network chip via a manager. For each interrupt, depending on its service level, the manager either instantaneously propagates the interrupt or delays propagation of the interrupt to the master. The master forwards the interrupts to different destinations. A destination can be a processing element that is located on the network chip or externally on a different chip.

For each network chip in the electronic system, N interrupt enable registers are created. Separately, each of the N interrupts can be routed either to different destinations or separately to the same destination. The former is used where different destinations will service each category of interrupts, while the latter is used where the interrupts will go as different levels to the same destination.

Hypothetically, assume that the network chip supports two service levels of interrupts, such as low priority and high priority. Each interrupt is forwarded on a bus, such as PCIe, to a destination, such as an external processing element or to an on-chip processing element, depending on its service level. The processing element at each destination determines how soon it will service the requests it receives.

In this hypothetical, a user first creates an XML description of different interrupts and a script that would generate four registers for each interrupt. The XML description is a register specification that includes information such as an associated service level of each interrupt. In some embodiments, the register specification also includes information such as destination data of each interrupt. The four registers generated for each interrupt include a status register, a test register and two priority registers. The two priority registers, a low priority enable register and a high priority forward register, correspond to the two service levels. The status register stores the status of an interrupt, which indicates whether or not the interrupt was set, and allows the interrupt to be cleared by a processing element in response to processing the interrupt. The low priority enable register allows the interrupt to be configured as a low priority interrupt. The high priority forward register allows the interrupt to be configured as a high priority interrupt. The test register allows the interrupt to be artificially forced and is used for testing purposes. In some embodiments, the XML description and the script are stored in the memory of the electronic system.

FIG. 1 illustrates an exemplary configuration interface 100 of a network chip in an electronic system in accordance with some embodiments. The network chip in FIG. 1 includes a master 105. An exemplary master 105 is a PCIe (peripheral component interconnect express) controller or any other suitable controller. The network chip in FIG. 1 also includes a manager 110 and a plurality of modules 115. In FIG. 1, the plurality of modules 115 is referred to as leaf nodes. Each of the modules 115 is a slave that includes a set of registers. Although five modules 115 are shown, more or less modules are possible.

Interrupts are raised at the leaf nodes 115. Continuing with the above hypothetical, when an interrupt is raised, the script categorizes the interrupt based on the XML description and updates accordingly the four registers associated with the interrupt. For example, the status register is set and either the low priority enable register or the high priority enable register is set, depending on the associated service level of the interrupt. This categorical representation of the interrupt is carried from the originating leaf node to the manager 110.

In some embodiments, the manager 110 instantaneously propagates high priority interrupts to the master 105. In some embodiments, the manager 110 accumulates low priority interrupts and propagates these low priority interrupts after a predetermined amount of time or count to the master 105. In some embodiments, the low priority interrupts are stored in a buffer or a queue accessed by the manager 110 before being propagated to the master 105.

Figure 2:
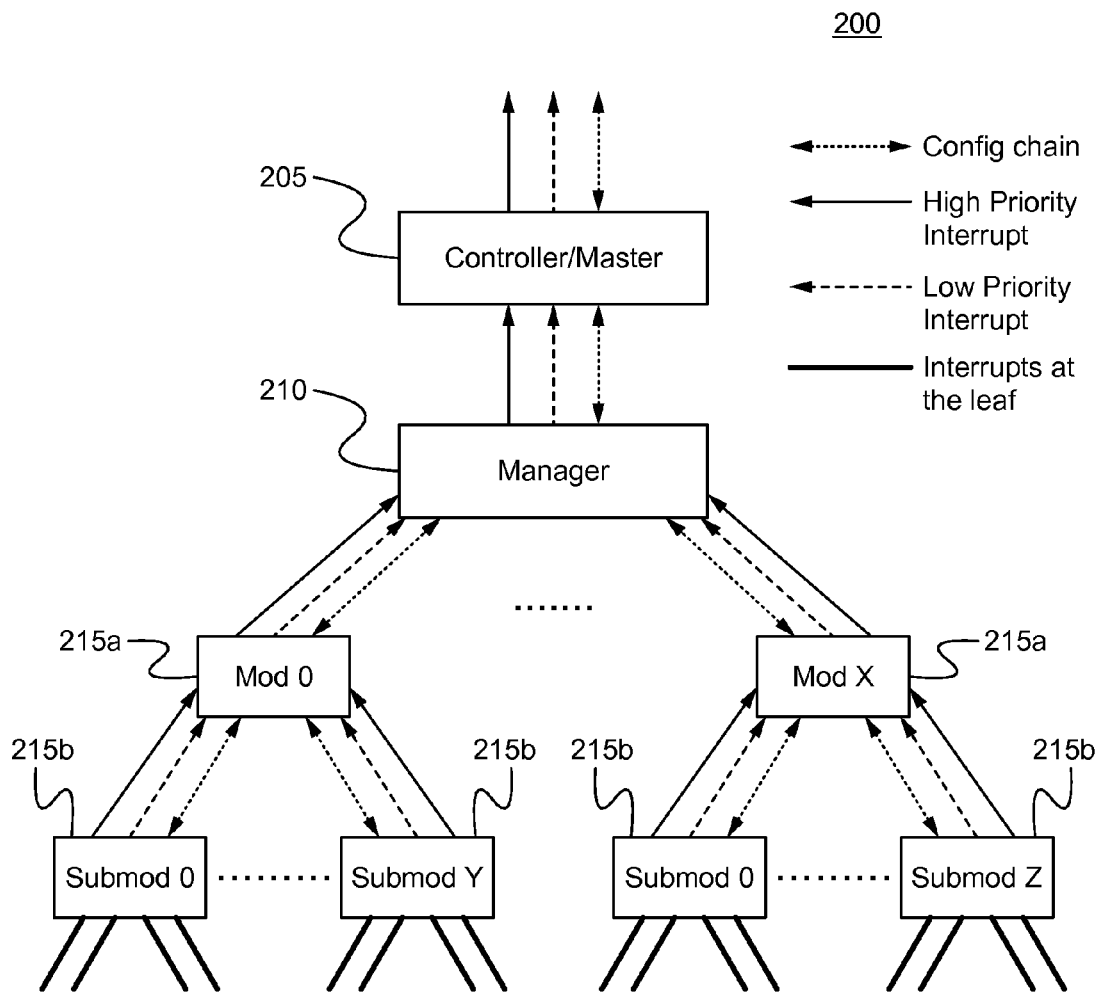
FIG. 2 illustrates another exemplary configuration interface of a network chip in an electronic system in accordance with some embodiments.

FIG. 2 illustrates another exemplary configuration interface 200 of a network chip in an electronic system in accordance with some embodiments. The network chip in FIG. 2 includes a master 205 and a manager 210, which are similarly configured the master 105 and the manager 110 of FIG. 1. The network chip in FIG. 2 also includes a plurality of modules 215 (collectively). Each of the plurality of modules 215 is referred to as a leaf node. Unlike the plurality of modules 115 of FIG. 1, the plurality of modules 215 is hierarchically organized as modules 215a and submodules 215b. Although FIG. 2 shows the modules 215 organized in two levels, the modules 215 can be hierarchically organized in more than two levels, depending on the specifics of the application. Regardless of how the plurality of modules 215 is organized, all of the plurality of modules 215 have the concept of low and high priority. All interrupts propagate independently to the manager 210 of the network chip. As previously discussed above, the manager 210 either instantaneously propagates an interrupt or delays propagation of the interrupt to the master 205. The master 205 forwards the interrupts to different destinations.

Although the above hypothetical has restricted the number of priority or service levels to two for the sake of simplicity, it should be understood that the present invention can be extended to M priority levels.

Figure 3:
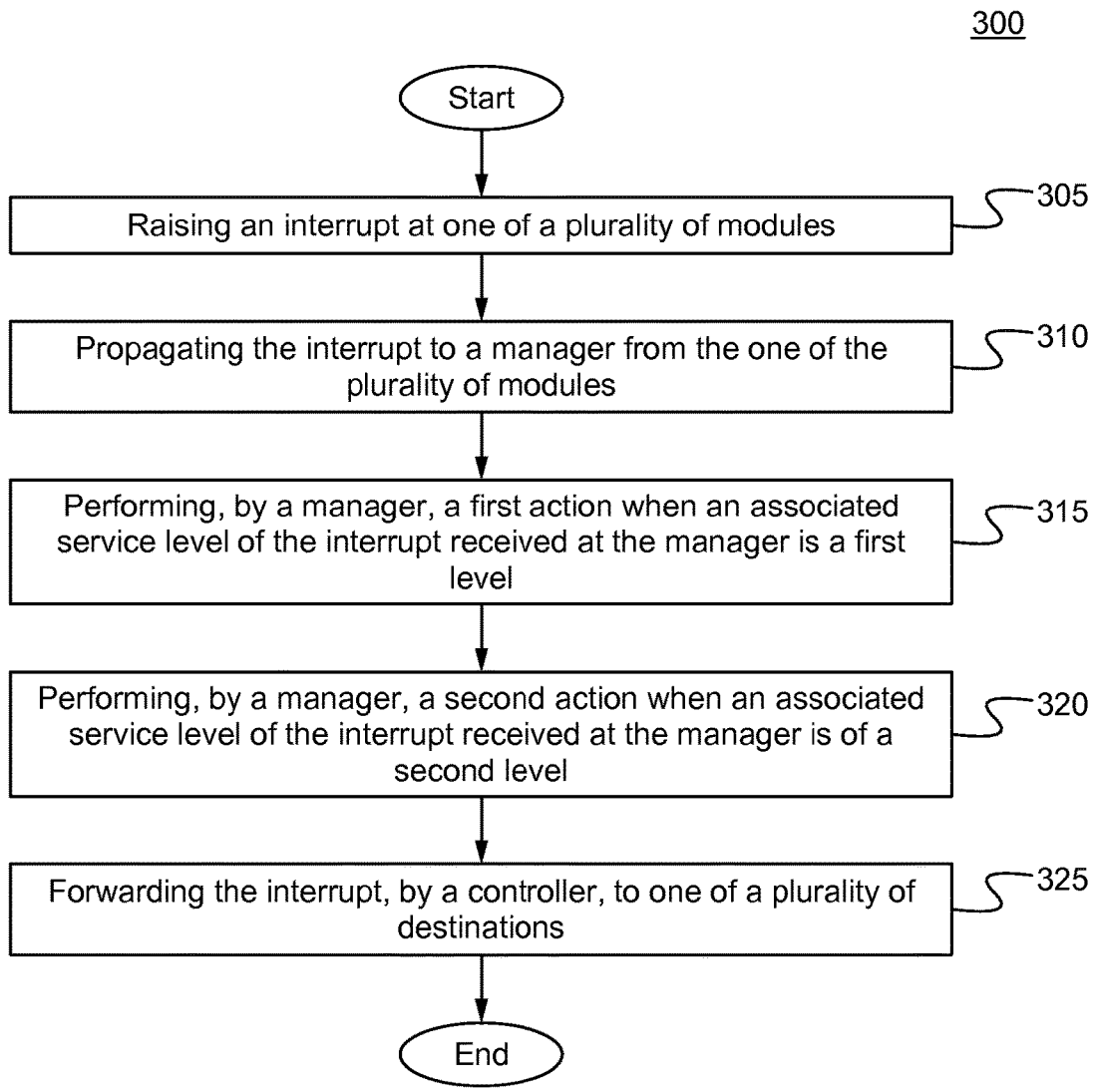
FIG. 3 illustrates an exemplary method of implementing a network ASIC in a network device in accordance with some embodiments.

FIG. 3 illustrates an exemplary method 300 of implementing a network ASIC in a network device in accordance with some embodiments. The network device includes a plurality of modules, a manager and a controller. In some embodiments, the plurality of modules, the manager and the controller are located on the network ASIC. At a step 305, an interrupt is raised at one of the plurality of modules. Each of the plurality of modules is a slave that includes a set of registers. In some embodiments, the plurality of modules is hierarchically organized.

In some embodiments, after the step 305 and before a step 310, a script runs, thereby categorizing the interrupt and updating a plurality of registers associated with the interrupt. In some embodiments, the interrupt is categorized according to a user-defined register specification. The user-defined register specification includes information regarding an associated service level of the interrupt and information regarding destination of the interrupt.

In some embodiments, the plurality of registers associated with the interrupt include at least two priority registers that corresponds with at least two different service levels.

At the step 310, the interrupt is propagated to the manager from the one of the plurality of modules. In some embodiments, the interrupt is propagated from the one of the plurality of modules to the manager via other modules in the plurality of modules.

At a step 315, the manager performs a first action when an associated service level of the interrupt received at the manager is a first level. In some embodiments, the first level is high priority and the first action is to instantaneously propagate the interrupt to the controller.

At a step 320, the manager performs a second action when an associated service level of the interrupt received at the manager is a second level. In some embodiments, the second level is low priority and the second action is delay propagation of the interrupt to the controller.

At a step 325, the controller forwards the interrupt to one of a plurality of destinations. The one of the plurality of destinations is indicated in the user-defined specification. The one of the plurality of destinations is a processing unit located on the network ASIC. Alternatively, the one of the plurality of destinations is a processing unit located on a chip different from the network ASIC. The processing unit at the one of the plurality of destinations determines how soon the processing unit will service each request received.

The network ASIC is configured to implement the multiple-interrupt propagation scheme, which uses the user-defined register specification and the script. In some embodiments, the user-defined register specification and the script are stored in memory of the network device. The multiple-interrupt propagation scheme is an automated mechanism for specifying and creating interrupts, while allowing the flexibility to categorize interrupts on the basis of level of service required and to send the interrupts to different end points.

One of ordinary skill in the art will realize other uses and advantages also exist. While the invention has been described with reference to numerous specific details, one of ordinary skill in the art will recognize that the invention can be embodied in other specific forms without departing from the spirit of the invention. Thus, one of ordinary skill in the art will understand that the invention is not to be limited by the foregoing illustrative details, but rather is to be defined by the appended claims.

We claim:

1. A network device comprising:
   a plurality of non-transitory computer-readable slave memories storing a plurality of modules;
   a plurality of interrupts originating from at least a portion of the plurality of modules, wherein each of the plurality of interrupts is associated with a corresponding one of a plurality of service levels;
   a manager configured to receive the plurality of interrupts and, for each interrupt of the interrupts received at the manager, to propagate the interrupt to a controller without added delay based on an associated service level of the interrupt received at the manager being a first level and to delay propagating the interrupt to the controller until a predetermined number of the interrupts are concurrently being delayed based on the associated service level of the interrupt received at the manager being a second level; and the controller configured to receive the plurality of interrupts from the manager and to forward the plurality of interrupts received at the controller to different destinations.

2. The network device of claim 1, further comprising a network application specific integrated circuit (ASIC), wherein the plurality of modules, the manager and the controller are located on the network ASIC.

3. The network device of claim 2, further comprising a first processing unit located on the network ASIC and a second processing unit externally located on a chip different from the network ASIC.

4. The network device of claim 3, wherein the different destinations include the first processing unit and the second processing unit.

5. The network device of claim 1, further comprising:
memory;
an extensible markup language (XML) description of different interrupts, wherein the XML description is stored in the memory; and
a script that generates a plurality of registers for each interrupt raised, wherein the script is stored in the memory.

6. The network device of claim 5, wherein the plurality of registers include at least two priority registers, a status register and a test register.

7. The network device of claim 5, wherein the script categorizes each of the plurality of interrupts based on the XML description and updates the plurality of registers associated with the each of the plurality of interrupts.

8. The network device of claim 1, wherein each of the plurality of modules is a slave that includes a set of registers.

9. The network device of claim 1, wherein the plurality of modules is hierarchically organized.

10. The network device of claim 1, wherein the first level is high priority.

11. The network device of claim 1, wherein the second level is low priority.

12. A network device comprising:
a multiple-interrupt propagation scheme; and
a network application specific integrated circuit (ASIC) configured to implement the multiple-interrupt propagation scheme and including:
a plurality of non-transitory computer-readable slave memories storing a plurality of modules generating a plurality of interrupts, wherein the plurality of interrupts is categorized according to their interrupt types;
a manager configured to forward each of the plurality of interrupts according to an associated categorization of a corresponding interrupt, wherein the manager forwards the corresponding interrupt without added delay based on the associated categorization of the corresponding interrupt being a first type and delays the forwarding of the corresponding interrupt until a predetermined number of the interrupts are concurrently being delayed based on the associated categorization of the corresponding interrupt being a second type; and
a controller configured to forward the plurality of interrupts received from the manager to a plurality of destinations.

13. The network device of claim 12, wherein the multiple-interrupt propagation scheme uses a user-defined register specification and a script that are both stored in memory of the network device.

14. The network device of claim 13, wherein the user-defined register specification includes an associated service level of each interrupt.

15. The network device of claim 13, wherein the user-defined register specification includes destination data of each interrupt.

16. The network device of claim 13, wherein the script generates at least two priority registers for each interrupt, wherein the at least two priority registers correspond to different service levels.

17. The network device of claim 16, wherein a first of the at least two priority registers allows an interrupt to be configured as a high priority interrupt, and a second of the at least two priority registers allows the interrupt to be configured as a low priority interrupt.

18. The network device of claim 16, wherein the characterization of the corresponding interrupt is associated with one of the different service levels.

19. The network device of claim 13, wherein the script categorizes each of the plurality of interrupts based on the user-defined register specification.

20. The network device of claim 12, wherein the controller is a peripheral component interconnect express (PCIe) controller.

21. The network device of claim 12, wherein each of the plurality of modules is a slave that includes a set of registers.

22. The network device of claim 12, wherein the plurality of modules is hierarchically organized.

23. The network device of claim 12, wherein the plurality of destinations include a first processing unit located on the network ASIC and a second processing unit externally located on a chip different from the network ASIC.

24. The network device of claim 12, wherein a processing unit at each of the plurality of destinations determines how soon the processing unit will service each request received.

25. A method of implementing a network application specific integrated circuit (ASIC) in a network device, wherein the network device includes a plurality of non-transitory computer-readable slave memories storing a plurality of modules, a manager, and a controller, the method comprising:
raising an interrupt at one of the plurality of modules;
propagating the interrupt to the manager from one of the plurality of modules;
propagating, by the manager, the interrupt to the controller without added delay based on an associated service level of the interrupt received at the manager being a first level;
delaying propagation of the interrupt to the controller until a predetermined number of interrupts are concurrently being delayed based on the associated service level of the interrupt received at the manager being a second level; and
forwarding the interrupt, by the controller, to one of a plurality of destinations.

26. The method of claim 25, further comprising, after raising an interrupt and propagating the interrupt, running a script to categorize the interrupt and to update a plurality of registers associated with the interrupt.

27. The method of claim 26, wherein the interrupt is categorized according to a user-defined register specification, wherein the user-defined register specification includes information regarding an associated service level of the interrupt and information regarding destination of the interrupt.

28. The method of claim 27, wherein the one of the plurality of destinations is indicated in the user-defined register specification.

29. The method of claim 26, wherein the plurality of registers include at least two priority registers that corresponds with at least two different service levels.

30. The method of claim 25, wherein the first level is high priority.

31. The method of claim 25, wherein the second level is low priority.

32. The method of claim 25, wherein each of the plurality of modules is a slave that includes a set of registers.

33. The method of claim 25, wherein the plurality of modules is hierarchically organized.

34. The method of claim 33, wherein the interrupt is propagated from the one of the plurality of modules to the manager via other modules in the plurality of modules.

35. The method of claim 25, wherein the one of the plurality of destinations is a processing unit located on the network ASIC.

36. The method of claim 25, wherein the one of the plurality of destinations is a processing unit located on a chip different from the network ASIC.

37. The method of claim 25, wherein the plurality of modules, the manager and the controller are located on the network ASIC.

38. The network device of claim 1, wherein the predetermined period is independent of jitter on the network device.

\* \* \* \* \*